Aug. 29, 1961   E. F. RIESING   2,998,397
BEARING ELEMENT COMPRISING THERMOPLASTIC
RESIN AND SINTERED TEFLON PARTICLES
Filed May 18, 1955
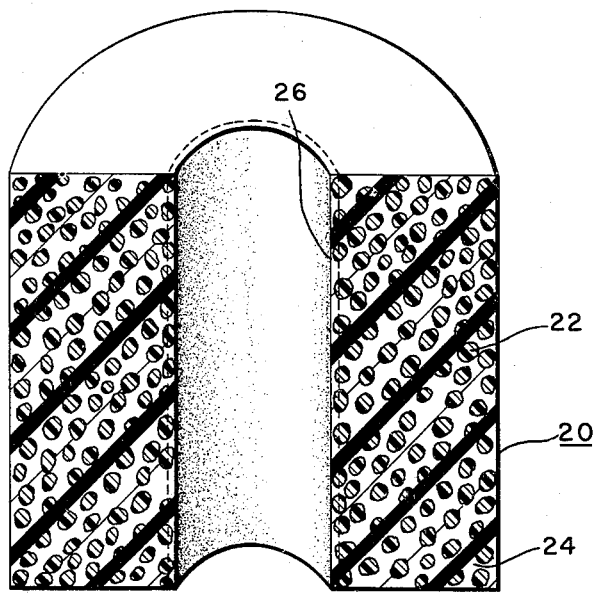
INVENTOR.
*Ellwood F. Riesing*
BY
*His Attorney*

United States Patent Office 2,998,397
Patented Aug. 29, 1961

2,998,397
BEARING ELEMENT COMPRISING THERMO-
PLASTIC RESIN AND SINTERED TEFLON
PARTICLES
Ellwood F. Riesing, Dayton, Ohio, assignor to General
Motors Corporation, Detroit, Mich., a corporation of
Delaware
Filed May 18, 1955, Ser. No. 509,207
3 Claims. (Cl. 260—17)

This invention relates to plastics and is particularly concerned with combinations of plastics wherein the desirable physical characteristics of one plastic may be utilized while maintaining said plastic dispersed in another and different plastic material and to methods for making the same.

It is therefore an object of the invention to provide a plastic material including two different chemical compounds wherein one compound is dispersed in a physical state within the other.

In carrying out this object it is another object of the invention to provide a method for injection molding a plastic material such as Teflon (polytetrafluoroethylene), which normally cannot be injection molded, by carrying dispersed particles of the Teflon in another easily injected plastic material which does not react appreciably therewith at the injection temperature, said other material preferably being a thermoplastic resin that is incompatible with the Teflon at the molding temperature.

A still further object of the invention is to provide a bearing material wherein the highly desirable qualities of Teflon are utilized in an injection molded low friction element through the use of dispersed particles of Teflon bonded together in a matrix of an incompatible thermoplastic resin wherein the bearing surface per se has been machined to expose Teflon surfaces.

Further objects and advantages of the present invention will be apparent from the following description, reference being had to the accompanying drawing which shows a bearing in cross section as one embodiment of the invention.

Teflon, which is the accepted trade name for the chemical compound polytetrafluoroethylene, is a plastic material that has highly desirable low friction characteristics. This material is well known for its anti-friction properties and may be usd in many applications as a substitute for metal of other bearing materials with improved results.

Teflon has one drawback in its use, namely the difficulty in molding the material economically. It is a well known fact that injection molding processes are the most economical in the manufacture of a plurality of small parts of similar shape. Teflon, however, due to its extremely high melting point (over 700° F.) and its tendency to sublime at temperatures approaching the melting point, has been impossible to use in injection molding processes. In past procedures molded parts from Teflon are made through compression molding operations wherein the mold cavity must be filled with a predetermined quantity of granular Teflon material and then closed and heated during the molding operation to actually sinter the particles of Teflon together into a coherent mass of the desired shape.

I have found that low friction articles which provide the desirable characteristics of Teflon may be manufactured by injection molding by mixing the Teflon with a suitable carrier material which in itself is easily injection molded and which binds the Teflon together in discrete particle form whereby the desirable qualities of the Teflon may be utilized without actually causing the Teflon to become molten during the molding operation.

The binder material to which I refer is an incompatible thermoplastic resin, for example, nylon (a polyamide), which is a generic term for any long-chain synthetic fiber-forming polymeric carbonamide which has recurring carbonamide groups as an integral part of the main polymer chain, methyl methacrylate, polystyrene, cellulose nitrate, cellulose butyrate, etc. These materials can be easily injection molded at temperatures considerably lower than the temperature required to sinter Teflon and therefore the process of mixing the materials whereby the carrier resin in a flowable state carries the solid Teflon particles, reduces the cost of the operation as well as making the injection molding step feasible.

I have found that a suitable carrier resin and Teflon may be mixed in quantities up to about 60% Teflon by weight although for low friction materials I prefer to use a 50–50 mixture. In this connection it is apparent that the percentage of Teflon may vary downwardly from the high limit of about 60% to any figure which will yield the desired physical characteristics and the figures noted are merely ranges in which suitable bearings may be made.

In practice the Teflon in the form of discrete particles preferably varying in size of from 1/64 to 1/32 of an inch in average diameter is mixed with the thermoplastic resin in the form of a molding powder preferably in about the same degree of comminution. The Teflon particles are made by grinding Teflon bar stock or by grinding scraps and flash of molded Teflon articles or, it may be obtained in powder form from the manufacturers thereof. In this connection it is important that the Teflon be of a sintered type rather than virgin molding powder. Sintered material is denser and is by far more desirable for my intended use. Furthermore sintered Teflon is usually scrap material from mechanical operations on molded Teflon and as such is less expensive.

Sintered Teflon is the virgin molding powder that has been processed as by compression and heat in a molding process to densify the particles and fuse away the horny, hook-like structure of the virgin molding powder particles. For this reason my invention is directed primarily to the use of sintered Teflon material in pulverulent form.

These sintered Teflon particles are intimately mixed with the powder of the carrier resin and the mixture is then heated as previously set forth to a temperature sufficient to make the carrier resin flowable as is well known in the art. It should be understood that carrier resins must be used that may be rendered flowable at a temperature lower than the sintering temperature for Teflon (above 700° F.) and preferably resins should be used that are flowable at temperatures of 500° F. and below. It is manifest that at these temperatures the Teflon particles have not changed in physical character and are still in discrete form dispersed throughout the flowable carrier. This flowable mixture is then injected by conventional procedures into a suitable mold and is allowed to cool whereupon an article is formed which includes a matrix resin and Teflon wherein the Teflon is present in the form of dispersed discrete particles bonded together and held in a matrix of a continuous phase of the carrier resin.

I have found that such material makes an excellent low friction element for many uses such as a bearing and one of such bearings is shown in the drawing at 20 wherein the particles of Teflon in discrete form are shown at 22 while the binder or carrier is shown at 24. In the molding operation, the bore 26 of the bearing 20 is preferably molded smaller than the bore ultimately desired. This is done because the carrier resin, being in a continuous phase, covers all surfaces of the discrete Teflon particles and in effect forms a continuous surface at all portions of the bearing 20. In order to make available the highly desirable frictional properties of the Teflon it is therefore necessary to ream the bearing 20 at the bore portion 26 thereof to expose the surfaces of the Teflon particles adjacent the bore 26. This is carried out with either a standard reamer or by machining the bore a few thousandths of an inch larger than the molded dimension. This brings the bore to a dimension designated by the dotted lines of the drawing and this surface is composed of Teflon areas surrounded by areas of the other resin.

The coefficient of friction of such a bearing is quite reduced over the coefficient of friction of a similar bearing formed from the carrier resin. For example, in a nylon-Teflon bearing, nylon has a coefficient of friction in the order of .4 while the sintered Teflon has a coefficient of friction in the order of .021. The coefficient of friction of the combined surface of the Teflon-nylon bearing is considerably less than that of nylon and slightly greater than that of Teflon since the Teflon does not form a continuous bearing surface. However, it does provide a bearing having a relatively low coefficient of friction and one which has all of the desirable characteristics of a Teflon bearing. It also provides a bearing which may be inexpensively fabricated through injection molding processes from scrap Teflon material and nylon.

Furthermore, due to the physical properties of Teflon, the bearing surface at certain temperatures, due to the high coefficient of expansion of Teflon at those temperatures, becomes substantially all Teflon since the surface particles of Teflon enlarge and tend to "grow" out of the surface of the bearing. This phenomenon is very noticeable at temperatures about normal room temperature, between 70° F. and 90° F. for example. Bearings to be used in this range of temperatures may be reamed at temperatures below room temperature to enhance the use of the phenomenon.

It is understood that while the description herein is directed to bearings that the same basic principles and materials may be utilized in connection with the manufacture of any article wherein the surface characteristics of Teflon are desired and wherein the cost thereof may be reduced through the use of sintered scrap Teflon material and injection molding processes.

While the forms of embodiment of the invention as herein disclosed constitute preferred forms, it is to be understood that other forms might be adopted, as may come within the scope of the claims which follow.

What is claimed is as follows:

1. A low friction bearing element comprising a thermoplastic resin composition including polytetrafluoroethylene in quantities of about 50% by weight of the composition and in the form of discrete dispersed sintered particles having a size of from $\frac{1}{64}$ to $\frac{1}{32}$ of an inch diameter dispersed in and bonded together by a matrix comprising a thermoplastic resin which makes up substantially the remainder of the article, said thermoplastic resin being one of a class consisting of any long-chain synthetic fiber-forming polymeric carbonamide which has recurring carbonamide groups as an integral part of the main polymer chain, polystyrene, polymethyl methacrylate, cellulose butyrate and cellulose nitrate.

2. A low friction bearing element comprising an article molded from a continuous phase of a thermoplastic resin taken from the class consisting of any long-chain synthetic fiber-forming polymeric carbonamide which has recurring carbonamide groups as an integral part of the main polymer chain, polystyrene, polymethyl methacrylate, cellulose butyrate and cellulose nitrate wherein sintered polytetrafluoroethylene particles having an average diameter not to exceed $\frac{1}{32}$ of an inch are uniformly dispersed therethrough in quantities of from 50 to 60% by weight and wherein the thermoplastic resin makes up the remainder of the article the bearing surface of said element includes exposed portions of said polytetrafluoroethylene particles.

3. A low friction bearing element comprising a matrix of a thermoplastic resin taken from the class consisting of any long-chain synthetic fiber-forming polymeric carbonamide which has recurring carbonamide groups as an integral part of the main polymer chain,, polystyrene, polymethyl methacrylate, cellulose butyrate and cellulose nitrate with discrete sintered particles of polytetrafluoroethylene having a size not exceeding $\frac{1}{32}$ of an inch average diameter dispersed therethrough in a substantially uniform state of dispersion, said thermoplastic resin making up at least 40% and not more than 50% by weight of the article.

References Cited in the file of this patent

UNITED STATES PATENTS

| 2,022,587 | Cunningham | Nov. 26, 1935 |
| 2,400,091 | Alfthan | May 14, 1946 |
| 2,413,498 | Hill | Dec. 31, 1946 |
| 2,695,425 | Stott | Nov. 30, 1954 |
| 2,698,966 | Stott | Jan. 11, 1955 |
| 2,719,833 | Vincent et al. | Oct. 4, 1955 |

FOREIGN PATENTS

| 486,628 | Canada | Sept. 16, 1952 |